(12) United States Patent
Hasegawa et al.

(10) Patent No.: US 11,212,376 B2
(45) Date of Patent: **\*Dec. 28, 2021**

(54) METHOD OF TRANSMITTING A DATA SIGNAL IN SYNC WITH A CLOCK SIGNAL

(71) Applicant: SOCIONEXT INC., Kanagawa (JP)

(72) Inventors: Teruaki Hasegawa, Kanagawa (JP); Kouichi Tsutsumi, Kanagawa (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,490

(22) Filed: Jun. 9, 2020

(65) Prior Publication Data

US 2020/0304612 A1   Sep. 24, 2020

Related U.S. Application Data

(63) Continuation of application No. 15/388,294, filed on Dec. 22, 2016, now Pat. No. 10,715,642, which is a
(Continued)

(30) Foreign Application Priority Data

Jun. 24, 2014   (JP) .............................. JP2014-128919

(51) Int. Cl.
  *H04L 29/08*   (2006.01)
  *H04N 21/434*   (2011.01)
  (Continued)

(52) U.S. Cl.
  CPC .............. *H04L 69/326* (2013.01); *H04J 3/06* (2013.01); *H04L 1/0002* (2013.01);
  (Continued)

(58) Field of Classification Search
  CPC ... H04L 69/326; H04L 1/0002; H04L 1/0045; H04J 3/06; H04N 21/434; H04N 21/4305
  See application file for complete search history.

(56) References Cited

U.S. PATENT DOCUMENTS 7,844,991 B1    11/2010   Nakamura et al.
7,934,145 B2 *   4/2011   Song ...................... H04H 20/28
                                                        714/784
(Continued)

FOREIGN PATENT DOCUMENTS

JP   H08-181715 A    7/1996
JP   2011-041242 A   2/2011
(Continued)

OTHER PUBLICATIONS

Non-Final Office Action issued in U.S. Appl. No. 15/388,294, dated May 1, 2018.
(Continued)

*Primary Examiner* — Rasheed Gidado
(74) *Attorney, Agent, or Firm* — McDermott Will and Emery LLP

(57) ABSTRACT

A method of transmitting a data signal in sync with a clock signal in a DTV receiver. The method includes performing demodulation processing and error correction processing on an input carrier wave and outputting signals resulting from these types of processing; acquiring a transport stream (TS) packet included in the signals; acquiring a variable-length packet included in the signals; and selecting either the TS packet or the variable-length packet and outputting the selected packet as the data signal, where to variable-length packet is either a type length value (TLV) packet or an Internet protocol (IP) packet.

10 Claims, 13 Drawing Sheets

Related U.S. Application Data continuation of application No. PCT/JP2015/002896, filed on Jun. 10, 2015.

(51) Int. Cl.
*H04N 21/43* (2011.01)
*H04J 3/06* (2006.01)
*H04L 1/00* (2006.01)

(52) U.S. Cl.
CPC ......... *H04L 1/0045* (2013.01); *H04N 21/434* (2013.01); *H04N 21/4305* (2013.01)

(56) References Cited

U.S. PATENT DOCUMENTS

| | | | |
|---|---|---|---|
| 8,817,780 B2* | 8/2014 | Ramesh | H04N 21/435 370/389 |
| 10,070,199 B2 | 9/2018 | Iguchi et al. | |
| 2001/0007578 A1* | 7/2001 | Ran | H03M 13/2909 375/253 |
| 2002/0015426 A1* | 2/2002 | Kim | H04N 21/43632 370/542 |
| 2005/0120374 A1* | 6/2005 | Stone | H04N 21/4882 725/80 |
| 2005/0204379 A1 | 9/2005 | Yamamori | |
| 2006/0034273 A1* | 2/2006 | Tamura | H04N 21/23614 370/389 |
| 2006/0274208 A1 | 12/2006 | Pedlow | |
| 2009/0235314 A1 | 9/2009 | Mito et al. | |
| 2010/0115569 A1 | 5/2010 | Takimoto et al. | |
| 2011/0289542 A1 | 11/2011 | Kitazato et al. | |
| 2012/0170596 A1 | 7/2012 | Hwang et al. | |
| 2013/0028271 A1* | 1/2013 | Limberg | H04L 1/005 370/479 |
| 2013/0247124 A1 | 9/2013 | Kitazato et al. | |
| 2014/0086407 A1 | 3/2014 | Gustafsson et al. | |
| 2014/0328354 A1* | 11/2014 | Michael | H04L 65/607 370/474 |
| 2015/0131746 A1 | 5/2015 | Hirayama et al. | |
| 2017/0134469 A1 | 5/2017 | Michael | |
| 2017/0264933 A1 | 9/2017 | Kitazato et al. | |

FOREIGN PATENT DOCUMENTS

| | | | |
|---|---|---|---|
| JP | 2011-103568 | A | 5/2011 |
| JP | 2013-175949 | A | 9/2013 |
| JP | 2013-247542 | A | 12/2013 |
| WO | 2013/011545 | A1 | 1/2013 |
| WO | 2014/061488 | A1 | 4/2014 |

OTHER PUBLICATIONS

Final Office Action issued in U.S. Appl. No. 15/388,294, dated Dec. 28, 2018.
Non-Final Office Action issued in U.S. Appl. No. 15/388,294, dated May 30, 2019.
Final Office Action issued in U.S. Appl. No. 15/388,294, dated Nov. 20, 2019.
Notice of Allowance issued in U.S. Appl. No. 15/388,294, dated Mar. 10, 2020.
ARIB STD-B44 Version 1.0, "Transmission System for Advanced Wide Band Digital Satellite Broadcasting," Association of Radio Industries and Businesses (ARIB), Jul. 29, 2009; with partial English translation and English explanation on Drawings pp. 46-47.
European Standard?EN 50083-9,"Cable networks for television signals, sound signalsand interactive servicesPart 9: Interfaces for CATV/SMATV headendsand similar professional equipment for DVB/MPEG-2 transport streams",Dec. 2002.
International Search Report issued in International Patent Application No. PCT/JP2015/002896, dated Sep. 1, 2015; with English translation.
Written Opinion issued in International Patent Application No. PCT/JP2015/002896, dated Sep. 1, 2015; with English translation.
Chinese Office Action dated Dec. 22, 2017, issued in counterpart Chinese Patent Application No. 2015800337732; with English translation.
Second Office Action dated Aug. 8, 2018, issued in counterpart Chinese Patent Application No. 2015800337732; with English translation.
Japanese Office Action dated Jul. 23, 2019 issued in corresponding Japanese Application No. 2016-529017; with English translation.
Notice of Allowane issued in U.S. Appl. No. 15/388,294, dated Mar. 10, 2020.

* cited by examiner

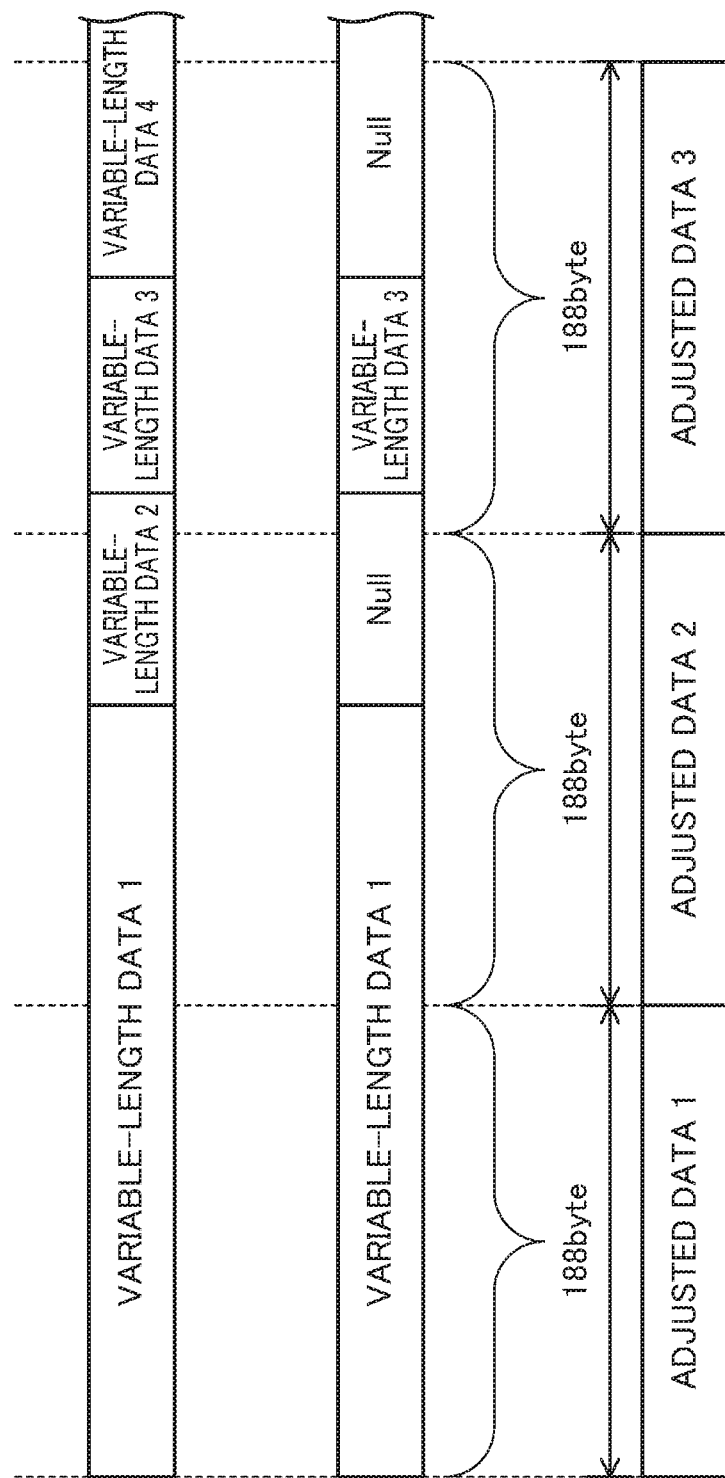

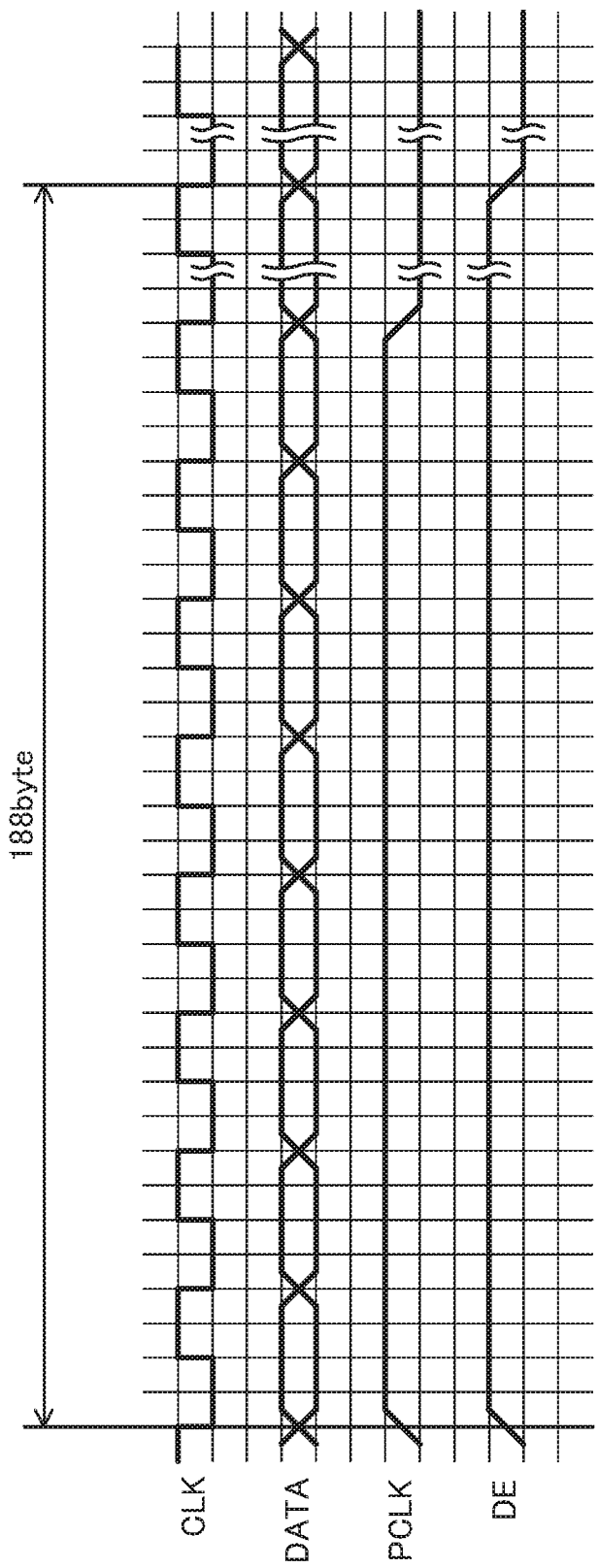

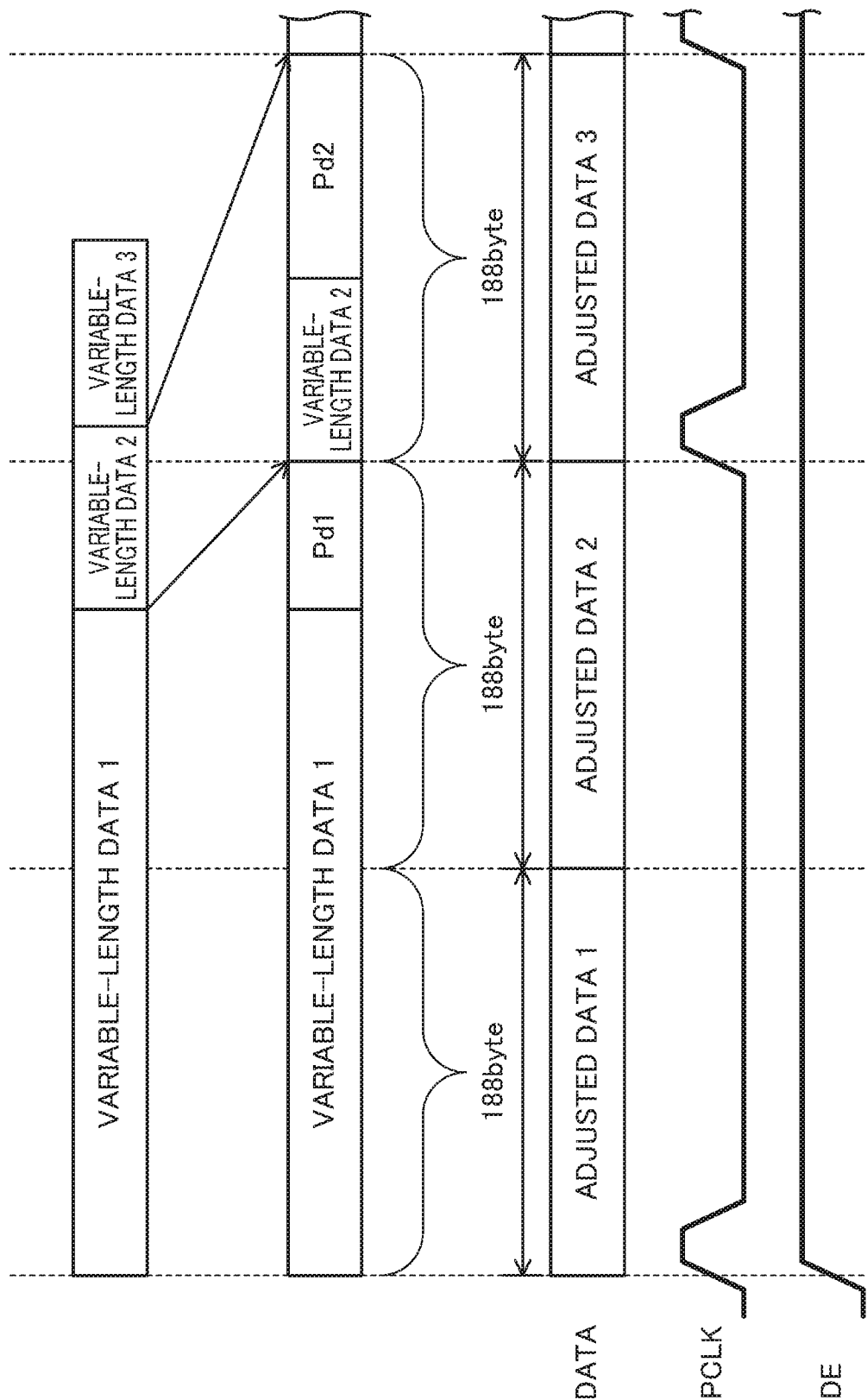

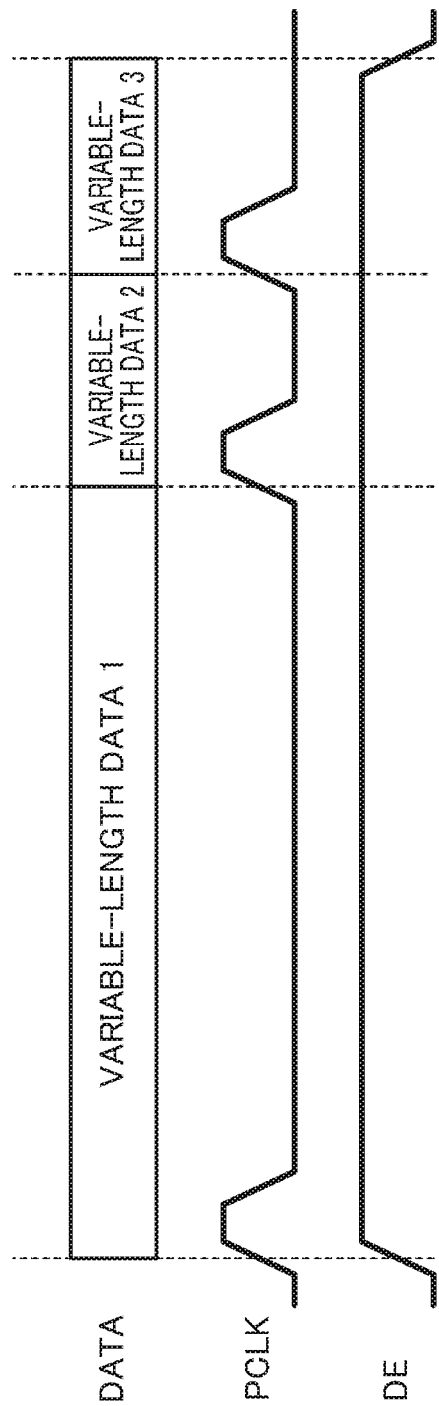

METHOD OF TRANSMITTING A DATA SIGNAL IN SYNC WITH A CLOCK SIGNAL

CROSS-REFERENCE TO RELATED APPLICATION

This is a continuation of U.S. patent application Ser. No. 15/388,294, filed on Dec. 22, 2016, now U.S. Pat. No. 10,715,642, which is a continuation of International Application No. PCT/JP2015/002896 filed on Jun. 10, 2015, which claims priority to Japanese Patent Application No. 2014-128919 filed on Jun. 24, 2014. The entire disclosures of these applications are hereby incorporated by reference.

BACKGROUND

The present disclosure relates to an interface device, and more particularly relates to a technique for transmitting data from the frontend to backend of a receiver for use in TV sets and other appliances.

A technique for transmitting a variable-length packet for use in communications and other purposes along with a transport stream (TS) used in broadcasting and other fields has been known in the art. In the field of advanced BS digital broadcasting, for example, a TS packet and a type length value (TLV) packet may be transmitted simultaneously (see, for example, ARM STD-B44 Version 1.0, "Transmission System for Advanced Wide Band Digital Satellite Broadcasting," Association of Radio Industries and Businesses (ARIB), Jul. 29, 2009). According to this technique, an Internet protocol (IP) packet is transmitted in a TLV format.

As devices for transmitting a TS packet and a variable-length packet such as a TLV packet simultaneously, disclosed are a transmitter for sending out a TS packet and a variable-length packet after having multiplexed them together and a receiver for de-multiplexing a multiplexed signal received into a TS packet and a variable-length packet (see, for example, Japanese Unexamined Patent Publication No. 2013-175949).

In such a receiver, after the received signal has been de-multiplexed by a frontend processor into a TS packet and a variable-length packet, these packets are generally subjected to decoding and other types of processing by a backend processor.

The TS packet serving as a data signal as shown in FIG. 7 of Japanese Unexamined Patent Publication No. 2013-175949 may be transmitted in response to not only a clock signal but also two other types of signals as indicated, in particular, by P12 and P13 in EUROPEAN STANDARD, EN 50083-9, "Cable Networks for Television Signals, Sound Signals and Interactive Services Part 9: Interfaces for CATV/SMATV Headends and Similar Professional Equipment for DVB/MPEG-2 Transport Streams," December 2002.

The receiver disclosed in FIG. 7 of Japanese Unexamined Patent Publication No. 2013-175949 needs to transmit not only a TS packet but also a TLV packet as well. However, neither Japanese Unexamined Patent Publication No. 2013-175949 nor any other document teaches exactly how to transmit the TLV packet.

Thus, to transmit a variable-length packet from the frontend processor to the backend processor, the receiver disclosed in FIG. 7 of Japanese Unexamined Patent Publication No. 2013-175949 may be provided with a terminal or line dedicated to transmitting the variable-length packet.

Providing such a dedicated terminal or line to transmit a variable-length packet, however, increases the overall number of terminals or lines to provide, which could possibly lead to an unwanted increase in the cost and/or circuit size of the receiver. Additionally, the increased number of lines provided may require changing the number of terminals to provide for the backend processor as well.

In view of the foregoing background, it is therefore an object of the present disclosure to provide an interface device having the ability to transmit a TS packet and a variable-length packet without causing an increase in the number of terminals or lines to provide.

SUMMARY

To achieve this object, an aspect of the present disclosure provides an interface device transmitting a data signal in sync with a clock signal. The interface device includes: a reception unit performing demodulation processing and error correction processing on an input carrier wave and outputting signals resulting from these types of processing; a transport stream (TS) packet acquisition unit acquiring a TS packet included in the outputs of the reception unit; a variable-length packet acquisition unit acquiring a variable-length packet included in the outputs of the reception unit; and a first selector selecting either the TS packet or the variable-length packet and outputting the selected packet as the data signal.

According to this aspect, when this interface device receives a carrier wave including a terrestrial digital broadcast signal, an advanced BS digital broadcast signal, or a communications signal, for example, the reception unit performs demodulation processing and/or error correction processing on the carrier wave. Next, the TS packet acquisition unit extracts a TS packet from the outputs of the reception unit and the variable-length packet acquisition unit extracts a variable-length packet from the outputs of the reception unit. After that, the first selector selectively outputs either the TS packet or the variable-length packet as a data signal, which is then sent out from this interface device in sync with a clock signal.

This allows the interface device to output the TS packet and the variable-length packet through the same terminal and same line. In other words, there is no need to separately provide any dedicated terminal or line exclusively for the purpose of outputting the variable-length packet. Thus, these packets may be transmitted with no increase caused in the number of terminals or lines to provide. Consequently, the cost and on-chip area of a receiver including such an interface device may be cut down.

Moreover, the device on the backend processor end, receiving the signal transmitted from this interface device, does not have to modify its specification so much in terms of the number of terminals to provide and/or protocol.

Alternatively, a receiver according to the present disclosure may include this interface device as a frontend processor.

The present disclosure provides an interface device having the ability to transmit a TS packet and a variable-length packet without causing an increase in the number of terminals or lines to provide.

B DESCRIPTION OF THE DRAWINGS

FIG. 11 illustrates a second exemplary situation where fixed-length packets are formed out of variable-length packets.

FIG. 12 is a timing chart illustrating a situation where the fixed-length packets shown in FIGS. 10 and 11 are sent out.

FIG. 13 is a timing chart illustrating a third exemplary situation where fixed-length packets are formed out of variable-length packets and sent out.

FIG. 14 is a timing chart illustrating a situation where a plurality of variable-length packets are sent out as they are.

DETAILED DESCRIPTION

First Embodiment

Figure 1:
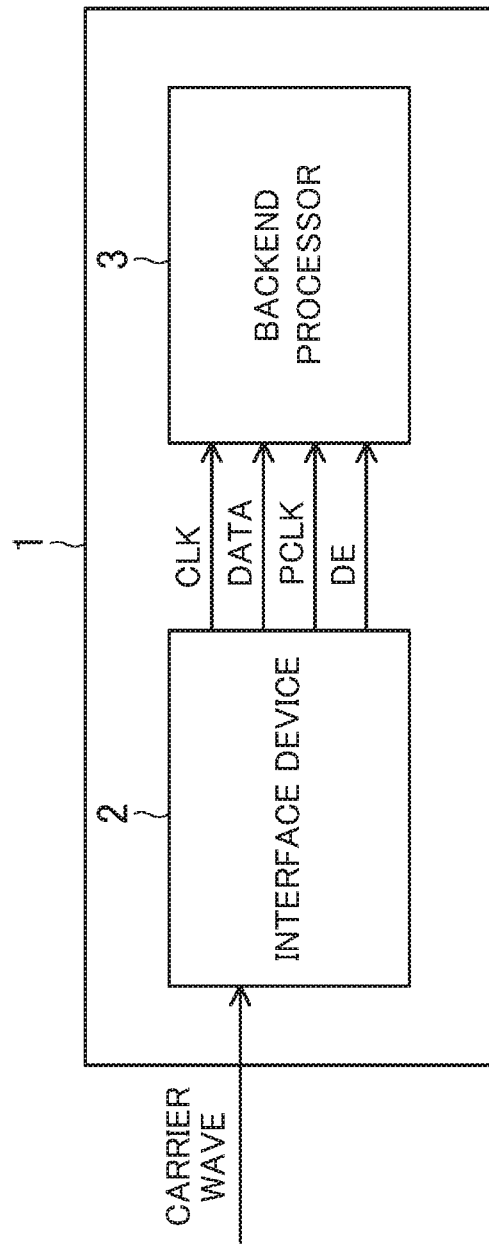
FIG. 1 is a block diagram illustrating a configuration for a receiver including an interface device according to a first embodiment.

FIG. 1 is a block diagram illustrating a receiver including an interface device according to a first exemplary embodiment. This receiver 1 may be built in a digital TV set, for example, and may receive various broadcasting service signals such as a terrestrial digital broadcast signal, an advanced BS digital broadcast signal, and a cable TV (CATV) broadcast signal, and a communications service signal that uses an IP packet or any other packet. This receiver 1 includes an interface device 2 functioning as a frontend processor, and a backend processor 3.

The interface device 2 receives at least one carrier wave such as an in-phase/quadrature-phase (I/Q) signal or an intermediate frequency (IF) signal via an antenna, extracts a TS packet and a variable-length packet from the carrier wave, and then sends these packets as a data signal DATA to the backend processor 3 in sync with a clock signal CLK. Examples of the carrier wave include a TV broadcast (such as BS broadcast or terrestrial digital broadcast) signal and a communications-related signal.

The interface device 2 may also output a packet clock signal PCLK indicating the leading edge of the signal DATA and a data enable signal DE indicating the activated period of the signal DATA.

Figure 2:
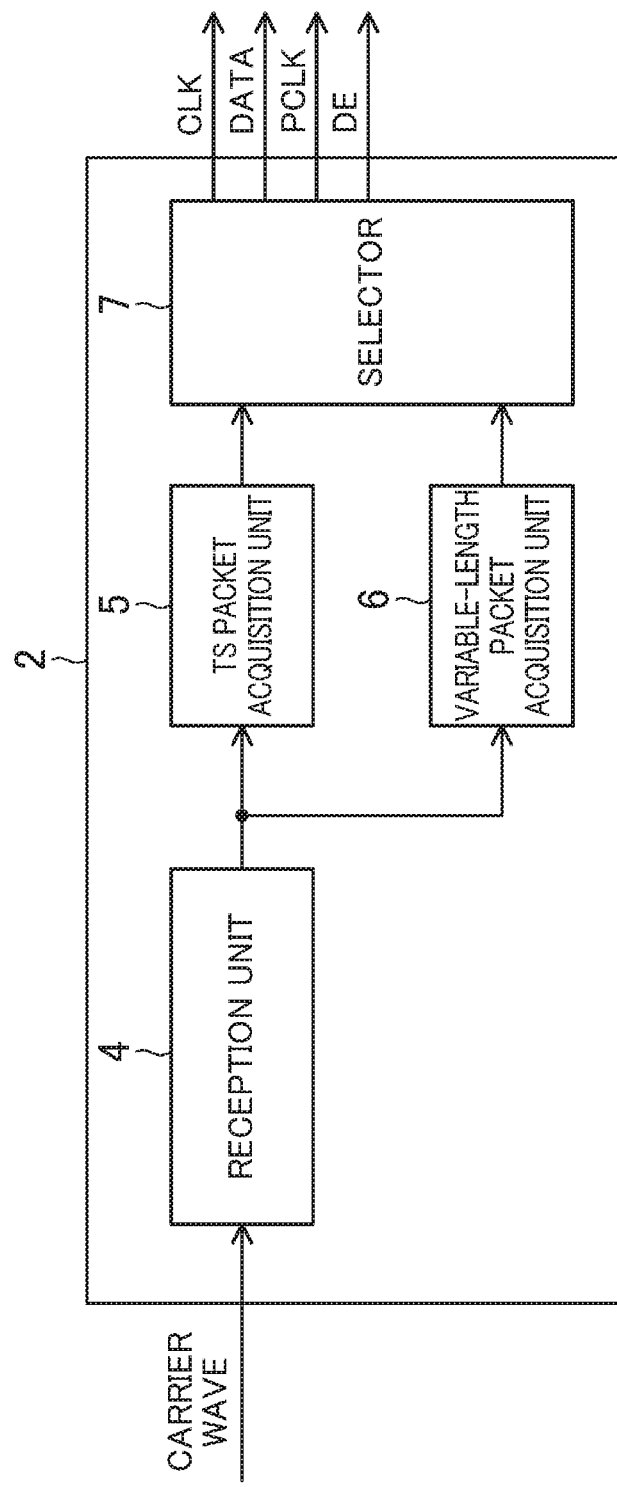
FIG. 2 is a block diagram illustrating a configuration for an interface device according to the first embodiment.

FIG. 2 is a block diagram illustrating an interface device according to the first embodiment. The interface device 2 includes a reception unit 4, a TS packet acquisition unit 5, a variable-length packet acquisition unit 6, and a selector 7 functioning as a first selector.

The reception unit 4 subjects the input carrier wave to, for example, analog-to-digital (A/D) conversion processing, demodulation processing such as 8 phase shift keying (PSK) processing or 16 amplitude and phase shift keying (APSK) processing, and error correction processing using a low density parity check (LDPC) code or a Bose-Chaudhuri-Hocquenghem (BCH) code.

Optionally, the reception unit 4 may perform any other type of processing as long as the reception unit 4 is able to output a required signal to the TS packet acquisition unit 5 and the variable-length packet acquisition unit 6.

The reception unit 4 may also include a tuner and may receive a signal representing a broadcast selected by the tuner in accordance with a user's command transmitted via a remote controller (hereinafter referred to as a "remotely transmitted command"), for example.

The TS packet acquisition unit 5 acquires a TS packet of a fixed length from the outputs of the reception unit 4 in accordance with transmission and multiplexing configuration and control (TMCC) information included in the carrier wave, and outputs the packet. For example, the TS packet acquisition unit 5 may extract a TS packet identified by a TS-identifier (TS-ID) specified.

The variable-length packet acquisition unit 6 acquires variable-length packets such as a TLV packet and packet with a variable length from the outputs of the reception unit 4 in accordance with the TMCC information, and outputs the variable-length packets. Optionally, the variable-length packet acquisition unit 6 may be connected behind the TS packet acquisition unit 5. The variable-length packet acquisition unit 6 may also extract a TLV packet identified by a TLV-identifier (TLV-ID) in accordance with a remotely transmitted command, for example.

That is to say, any other configuration may also be adopted as long as the TS packet acquisition unit 5 and variable-length packet acquisition unit 6 may acquire a TS packet and a variable-length packet, respectively, from the outputs of the reception unit 4.

The selector 7 selectively passes either the output of the TS packet acquisition unit 5 or that of the variable-length packet acquisition unit 6. For example, the selector 7 may change the packets to output from the TS packet into the variable-length packet, or vice versa, either in accordance with the remotely transmitted command or the command issued by the backend processor 3. In any case, the selector 7 outputs the selected packet as a signal DATA.

Optionally, the selector 7 may include a circuit that is able to generate signals CLK, PCLK and DE and that may be provided inside the interface device 2.

Moreover, the selector 7 may change the packets to output from the TS packet to the variable-length packet, or vice versa, at an arbitrary time. For example, if the inputs to the selector 7 are time-division multiplexed, then the selector 7 may be switched in accordance with the time division multiplexed data.

Figure 3:
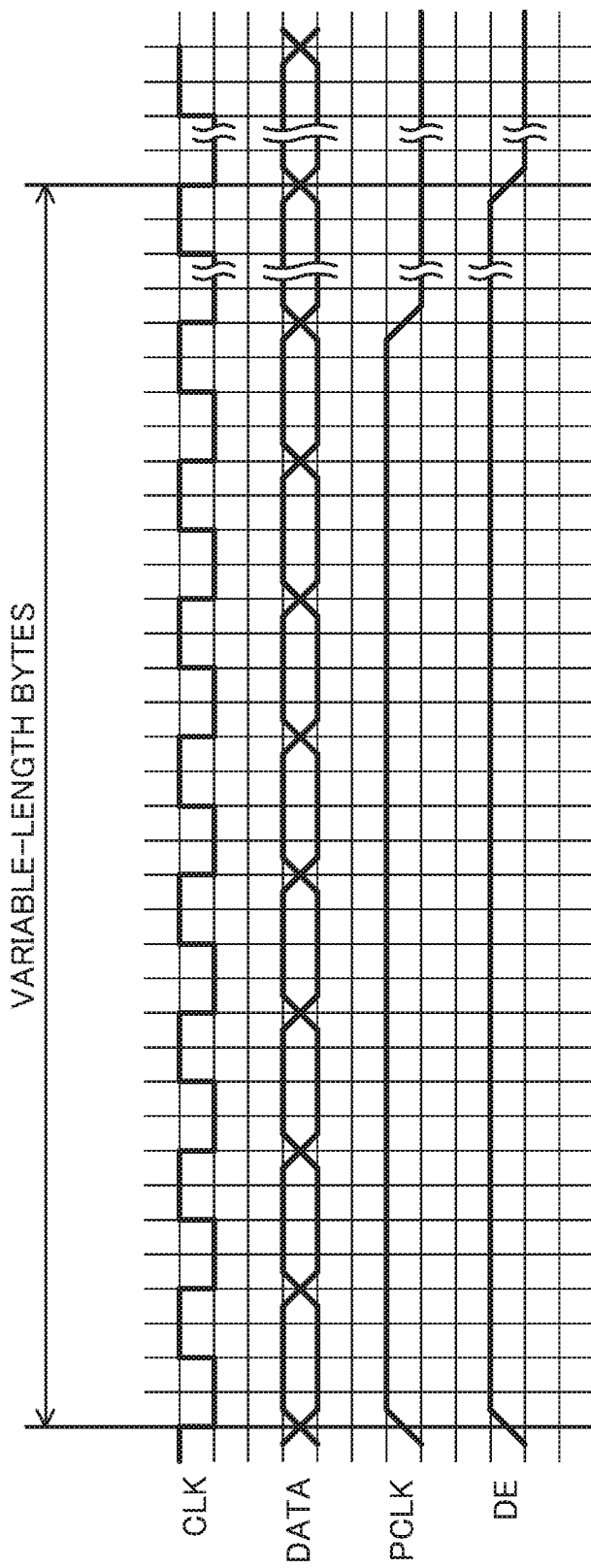
FIG. 3 is a timing chart showing waveforms of respective output signals of an interface device according to the first embodiment.

FIG. 3 is a timing chart showing waveforms of respective output signals of an interface device according to the first embodiment. Note that FIG. 3 shows a situation where the selector 7 is selectively outputting the variable-length packet, i.e., a signal DATA of variable-length bytes is being serially transmitted.

As shown in FIG. 3, the signal DATA, which is variable-length data of a TLV packet, for example, is sent out in sync with the signal CLK. Note that the signal PCLK may behave in a predetermined manner in the vicinity of a leading edge of the signal DATA, e.g., may be activated at the first one byte of the signal DATA.

On the other hand, if the selector 7 is selectively outputting the TS packet, the signal DATA, which is fixed-length data of 188 bytes, for example, is sent out in sync with the signal CLK.

Optionally, if the backend processor 3 may be equipped to perform the processing of locating the leading edge and activated period of the signal DATA, then the signals PCLK and DE may be omitted.

Moreover, the signal DATA may also be transmitted in parallel as well.

As can be seen, according to this embodiment, the selector 7 may selectively output, as the signal DATA, a TS packet of a fixed length or a TLV packet or IP packet of a variable length. This allows the interface device 2 to use the same terminal and same signal line for sending out both a fixed-length packet and a variable-length packet alike.

EUROPEAN STANDARD, EN 50083-9 cited above discloses an example in which not only the data signal and the clock signal but also two more signals, i.e., four signals in total, are used to transmit the TS packet. Thus, this technique may be used to transmit the TS packet, output from the receiver shown in FIG. 7 of Japanese Unexamined Patent Publication No. 2013-175949, to a device on the next stage. The TLV packet to be output separately from the TS packet by the receiver shown in FIG. 7 of Japanese Unexamined Patent Publication No. 2013-175949 also needs to be sent out the next stage separately. However, none of these documents specifically teach how to transmit a variable-length packet such as a TLV packet.

For that purpose, a dedicated terminal and line could be provided for sending out the TLV packet. In that case, however, the cost and circuit size of the device could potentially increase. Moreover, increased numbers of terminals or lines provided could lead to a significant change in the specification of a device on the next stage.

In contrast, according to this embodiment, the TS packet and the variable-length packet may be transmitted through the same terminal and same signal line, which thus eliminates the need for any dedicated terminal or signal line for transmitting the variable-length packet. That is to say, multiple different types of data may be transmitted even if the number of terminals or lines to provide is not increased.

This may reduce the cost and circuit size of the interface device 2. In addition, since there is no need for the backend processor 3 to increase the number of its terminals, the backend processor 3 does not have to change its configuration significantly, either.

Next, an exemplary configuration for the variable-length packet acquisition unit 6 will be described.

Figure 4:
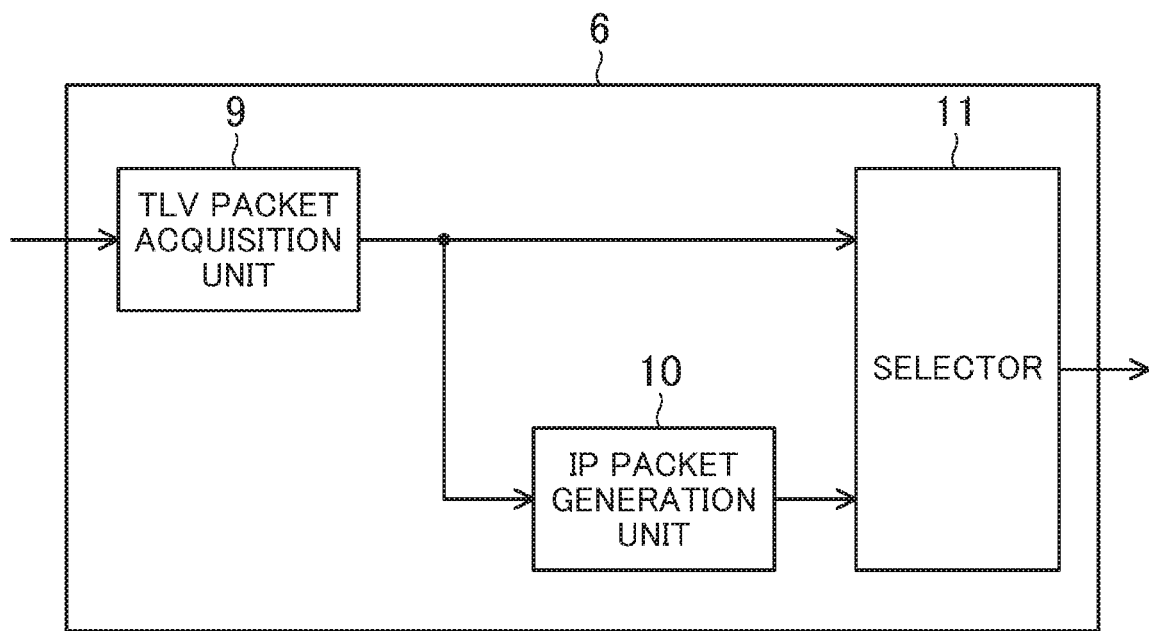
FIG. 4 is a block diagram illustrating an exemplary configuration for a variable-length packet acquisition unit according to the first embodiment.

FIG. 4 is a block diagram illustrating an exemplary configuration for a variable-length packet acquisition unit according to the first embodiment.

The variable-length packet acquisition unit 6 includes a TLV packet acquisition unit 9, an IP packet generation unit 10, and a selector 11 functioning as a second selector.

If the variable-length packet acquisition unit 6 may only output a TLV packet, then the IP packet generation unit 10 and the selector 11 may be omitted.

The TLV packet acquisition unit 9 may acquire a TLV packet from the output of the reception unit 4 by reference to pointer/slot information included in the TMCC information. In addition, the TLV packet acquisition unit 9 also outputs a TLV packet identified by the TLV-ID specified in accordance with the remotely transmitted command, for example, and included in the TMCC information. As used herein, the "pointer/slot information" is a piece of information included in each slot to indicate the respective locations of the first and last packets. The TLV-ID may be determined with the remote controller as described above or in accordance with some protocol such as Internet Group Management Protocol (IGMP) or Multicast Listener Discovery (MLD).

The IP packet generation unit 10 generates an IP packet based on the header information of the TLV packet. The IP packet is transmitted in a TLV form. Thus, if the header information of the TLV packet indicates that the TLV packet is an IP packet, an IP packet is generated from the TLV packet.

Optionally, the IP packet generation unit 10 may also generate a user datagram protocol (UDP) packet.

The selector 11 selects either the output of the TLV packet acquisition unit 9 or that of the IP packet generation unit 10. If necessary, the selector 11 may be switchable in accordance with a remotely transmitted command, for example, A variable-length packet acquisition unit 6 with such a configuration may selectively output any of multiple different types of packets including a TLV packet and an IP packet.

Figure 5:
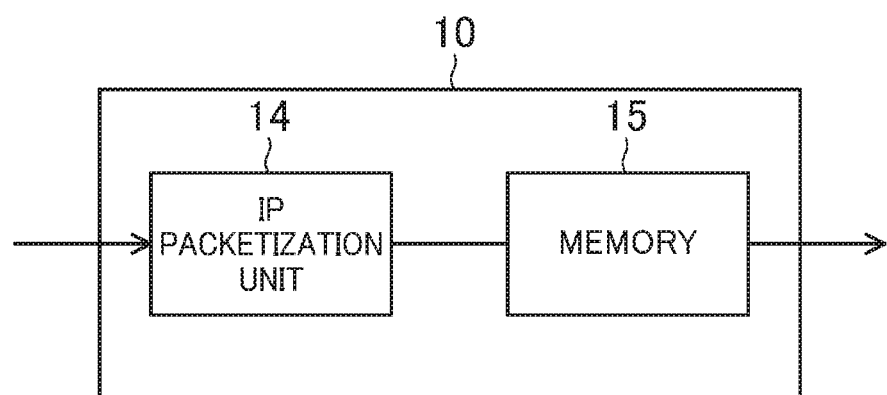
FIG. 5 is a block diagram illustrating an exemplary configuration for the IP packet generation unit shown in FIG. 4.

FIG. 5 is a block diagram illustrating an exemplary configuration for the IP packet generation unit. As shown in FIG. 5, the IP packet generation unit 10 may include an IP packetization unit 14 and a memory 15, for example.

The IP packetization unit 14 determines whether or not the header information of a TLV packet received indicates that it is an IP packet. If the packet received turns out to be an IP packet in a TLV format, then the IP packetization unit 14 removes a TLV header from the packet to turn it into an IP packet and output the IP packet.

In addition, the IP packetization unit 14 may also determine whether or not the header of the IP packet received (i.e., an IP/UDP header, which will be hereinafter simply referred to as a "header") has been compressed, and if the answer is YES, may output the packet with its header decompressed.

Note that if the TLV packet received is not an IP packet in a TLV form, then the IP packetization unit 14 may output the TLV packet as it is without turning it into an IP packet.

The memory 15 is a buffer configured to output buffered packets as a burst. Optionally, the memory 15 may be provided ahead of the IP packetization unit 14.

As can be seen, the IP packet generation unit 10 may be configured to output packets as a burst such that the buffered packets are intermittently output on and off. Alternatively, the IP packet generation unit 10 may also be configured to output those packets continuously.

In this case, if the header of the given IP packet has been compressed, then the header is decompressed by the IP packet generation unit 10. Thus, the output transmission rate of the IP packet generation unit 10 is suitably higher when the header has been compressed than when the header has not been compressed.

Alternatively, if the header of the given IP packet has been compressed, then the output transmission rate of the IP packet generation unit 10 is suitably higher than the input transmission rate thereof.

Figure 6:
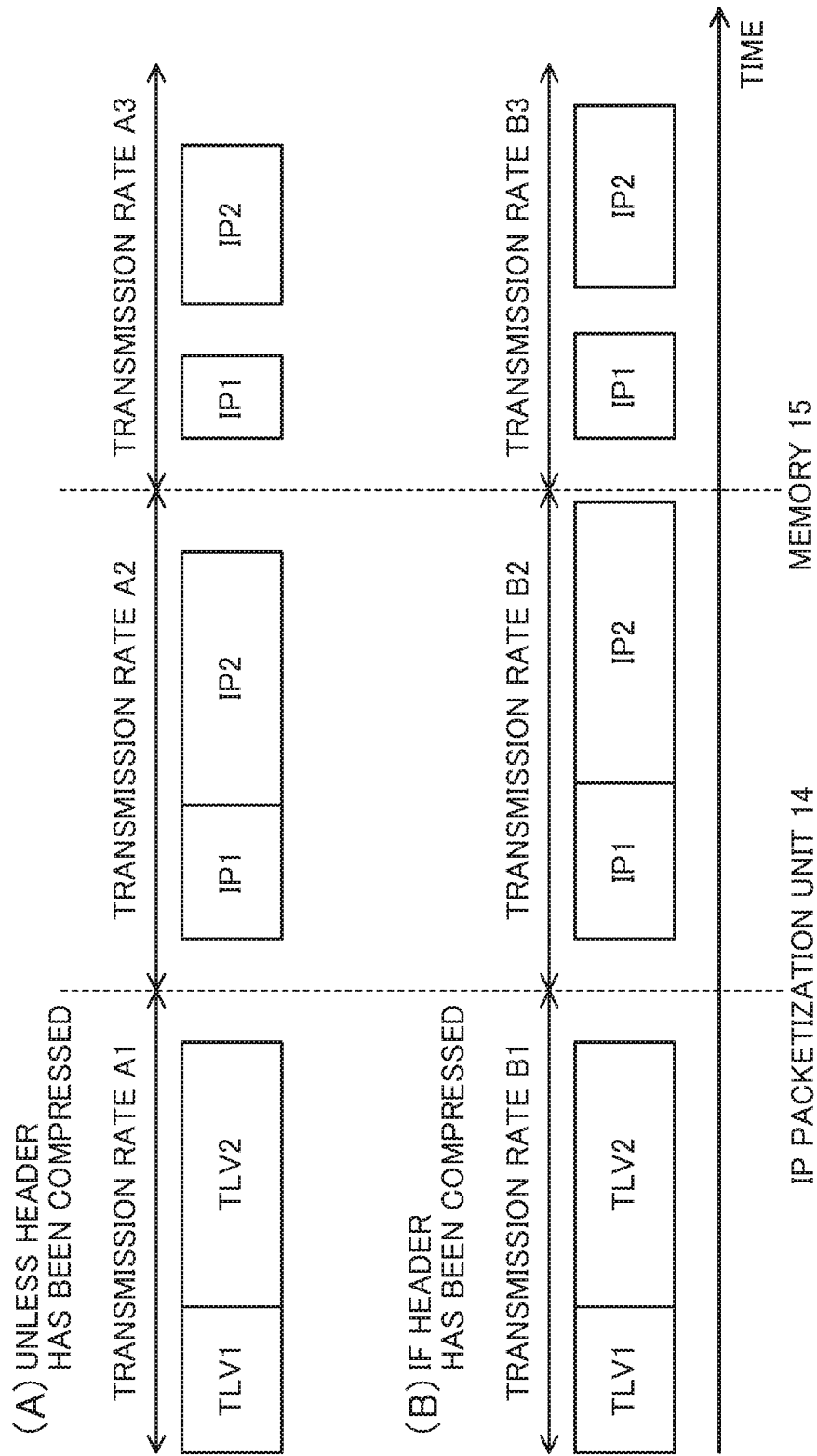
FIG. 6 shows how the transmission rate may change depending on the data handled by the IP packet generation unit shown in FIG. 5.
Figure 7:
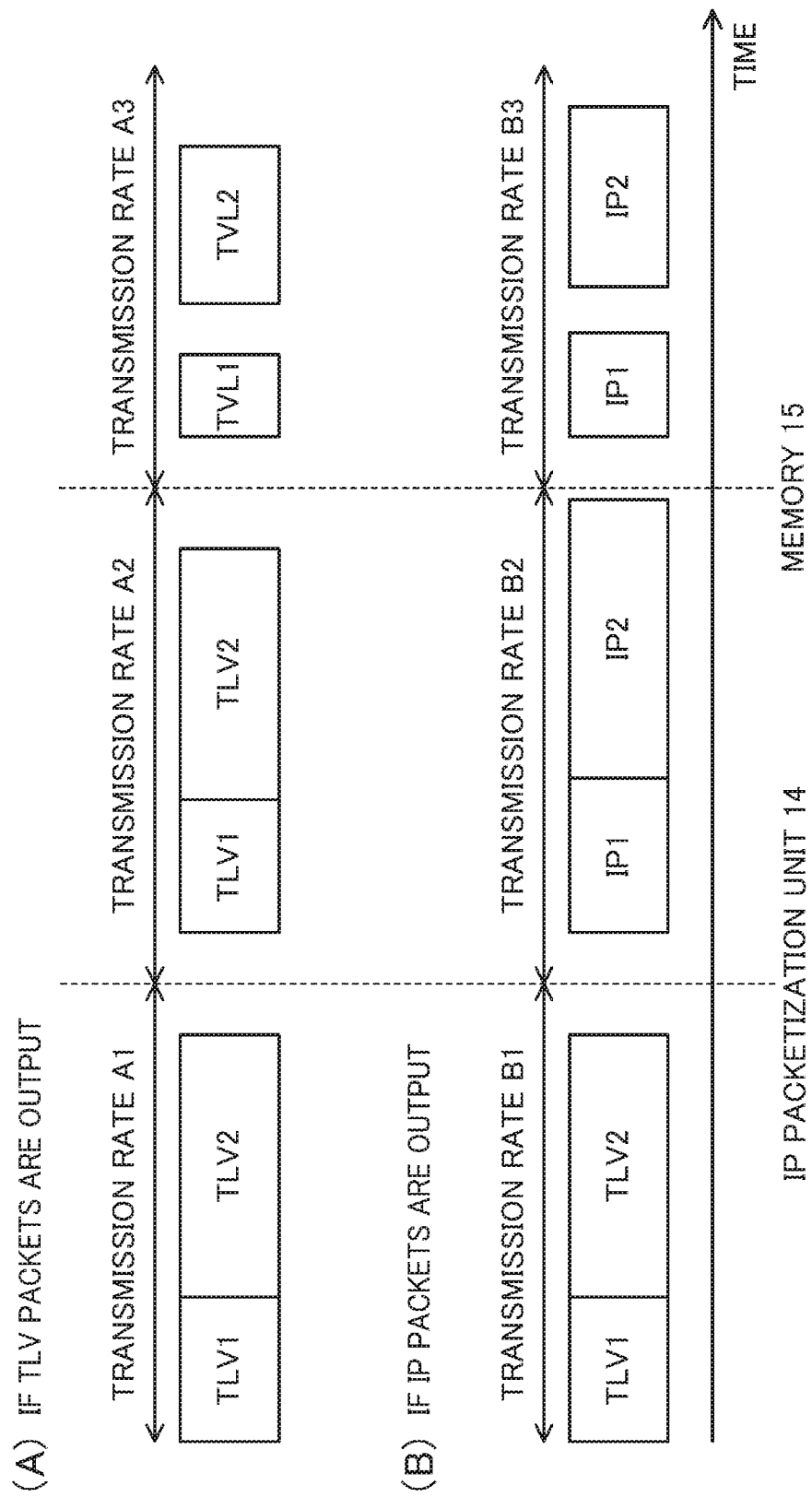
FIG. 7 shows how the transmission rate may also change depending on the data handled by the IP packet generation unit shown in FIG. 5.

These points will be cleared up with reference to FIGS. 6 and 7.

FIG. 6 shows how the transmission rate may change depending on the data handled by the IP packet generation unit shown in FIG. 5. Portion (A) of FIG. 6 illustrates a situation where the header has not been compressed, while portion (B) of FIG. 6 illustrates a situation where the header has been compressed. In the example shown in FIG. 6, a packet in a TLV form is input, turned into an IP packet, and then output.

In portion (A) of FIG. 6, TLV packets TLV1 and TLV2 are input at a transmission rate A1 to the IP packetization unit 14, which removes the TLV header from the packets TLV1 and TLV2, generates IP packets IP1 and IP2 based on these packets TLV1 and TLV2, respectively, and then outputs the IP packets IP1 and IP2 at a transmission rate A2.

These packets IP1 and IP2 are buffered by the memory 15, and then output as a burst at a transmission rate A3 from the IP packet generation unit 10.

Note that the transmission rates A1-A3 shown in portion (A) of FIG. 6 may be arbitrary ones.

On the other hand, in portion (B) of FIG. 6, TLV packets TLV1 and TLV2 are input at a transmission rate B1 to the IP packetization unit 14, which removes the TLV header from the packets TLV1 and TLV2 and decompresses their header to generate IP packets IP1 and IP2 and output the IP packets IP1 and IP2 at a different transmission rate B2.

These packets IP1 and IP2 are buffered by the memory 15, and then output as a burst at a transmission rate B3 from the IP packet generation unit 10.

As can be seen, if the header has been compressed, then the header needs to be decompressed. That is why the packets IP1 and IP2 shown in portion (B) of FIG. 6 have a larger size than the packets IP1 and IP2 shown in portion (A) of FIG. 6.

Thus, the IP packet generation unit 10 according to this embodiment is configured to switch its transmission rates such that its output transmission rate B3 becomes higher than its input transmission rate 131 if the header has been compressed.

Alternatively, the IP packet generation unit 10 may also switch its transmission rates such that its output transmission rate B3 when the header has been compressed becomes higher than its output transmission rate A3 when the header has not been compressed.

That is to say, the IP packet generation unit 10 may change its transmission rates such that either the inequality "transmission rate A3<transmission rate B3" or the inequality "transmission rate B1<transmission rate B3" is satisfied.

Optionally, regarding the transmission rates B2 and B3, if high-frequency clock pulses are used to determine the transmission rates, then the packets may be output regularly as a burst in sync with such clock pulses.

Alternatively, the transmission rate A3 may be adjusted to the transmission rate B3. In that case, no matter whether the header has been compressed or not, there is no need to switch the transmission rates and the packets may be sent out at a high transmission rate.

FIG. 7 shows how the transmission rate may change depending on the data handled by the IP packet generation unit shown in FIG. 5. Portion (A) of FIG. 7 illustrates a situation where TLV packets are output, while portion (B) of FIG. 7 illustrates a situation where IP packets are output. In portion (B) of FIG. 7, the header is assumed to have been compressed.

As shown in portion (A) of FIG. 7, unless the TLV packets are turned into IP packets by the IP packet generation unit 10, the TLV packets TLV1 and TLV2 received at the IP packetization unit 14 are buffered by the memory 15, and then output as a burst at a transmission rate A3.

On the other hand, as shown in portion (B) of FIG. 7, if the TLV packets are turned into IP packets, then the IP packetization unit 14 removes the TLV header from the packets TLV1 and TLV2 and decompresses their header, and packets IP1 and IP2 are output at a transmission rate B2.

The packets IP1 and IP2 are buffered by the memory 15, and then output as a burst from the IP packet generation unit 10 at a transmission rate B3. In this case, the inequality "transmission rate B1<transmission rate B3" may be satisfied.

In this example, portion (A) of FIG. 7 illustrates a situation where TLV packets are output. Optionally, the transmission rates A1-A3 may be respectively set to be equal to the transmission rates B1-B3 shown in portion (B) of FIG. 7.

Then, the TLV packets may be output as a burst in sync with high-frequency clock pulses, and there is no need to change the clock frequency to output the TLV packets.

Also, if the clock pulses used to output these packets have a constant frequency, then it becomes easier for the backend processor 3 to carry out its reception processing.

Optionally, Generic Stream Encapsulated (GSE) packets may be transmitted as variable-length packets.

—Variations—

Figure 8:
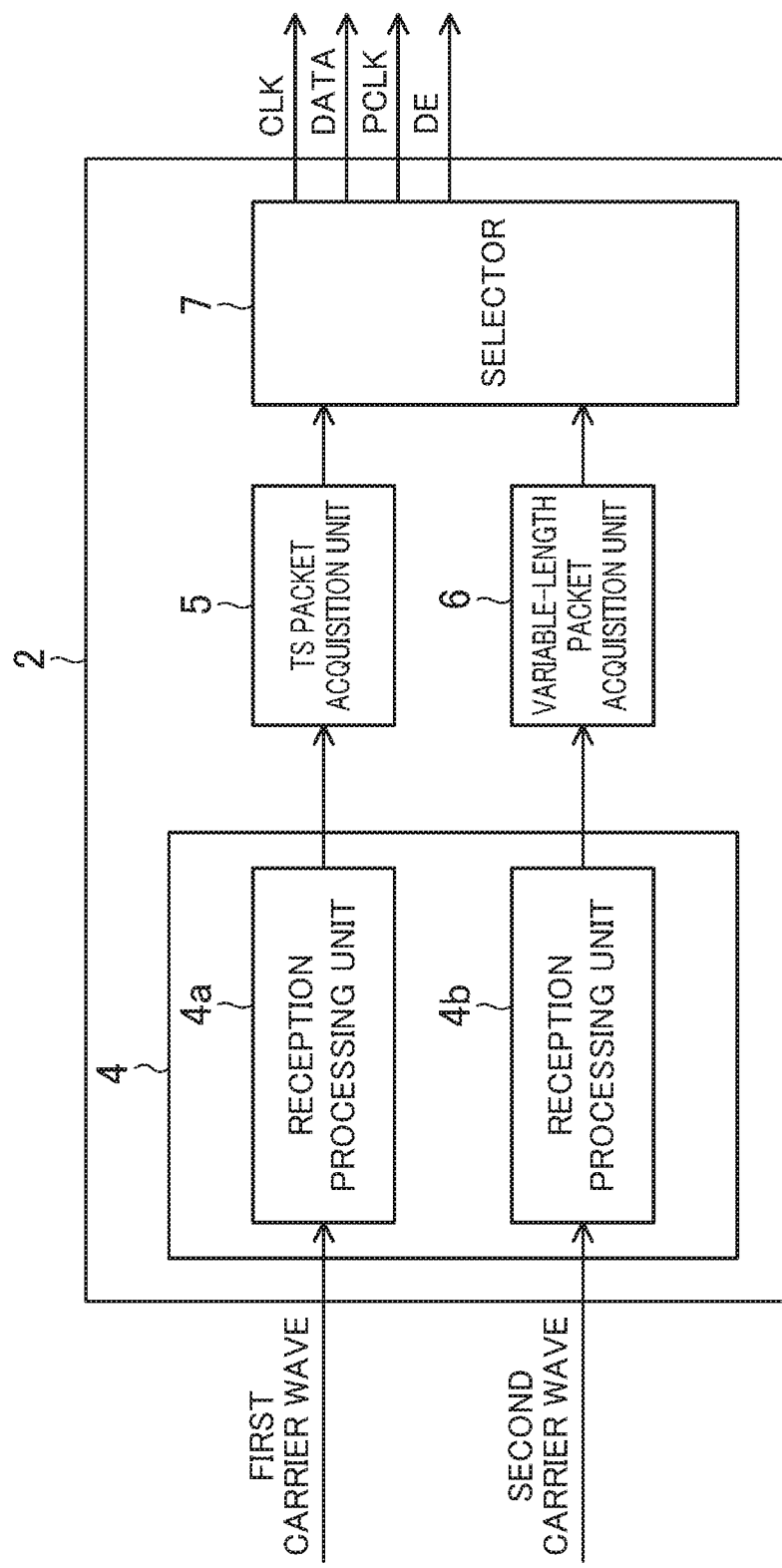
FIG. 8 is a block diagram illustrating a configuration for an interface device according to a variation of the first embodiment.

FIG. 8 is a block diagram illustrating a configuration for an interface device according to a variation of the first embodiment. The following description of the interface device shown in FIG. 8 will be focused on differences from its counterpart shown in FIG. 2.

The reception unit 4 includes a first reception processing unit 4a and a second reception processing unit 4b.

The first reception processing unit 4a receives a first carrier wave representing a terrestrial digital broadcast, for example, performs A/D conversion, demodulation, error correction, and other types of processing on the first carrier wave to convert it into a format compatible with the TS packet acquisition unit 5, and then outputs the first carrier wave thus converted.

The second reception processing unit 4b receives a second carrier wave representing a BS digital broadcast, for example, performs A/D conversion, demodulation, error correction, and other types of processing on the second carrier wave to convert it into a format compatible with the variable-length packet acquisition unit 6, and then outputs the second carrier wave thus converted.

As can be seen, the reception unit 4 may be configured to receive multiple different carrier waves, perform the processing described above on each of those carrier waves, and then output resultant signals to the TS packet acquisition unit 5 and variable-length packet acquisition unit 6, respectively.

Even an interface device with such a configuration also allows the selector 7 to selectively output either TS packets or variable-length packets such as TLV packets, and therefore, may also transmit multiple different types of packets through the same terminal and same signal line.

Second Embodiment

Figure 9:
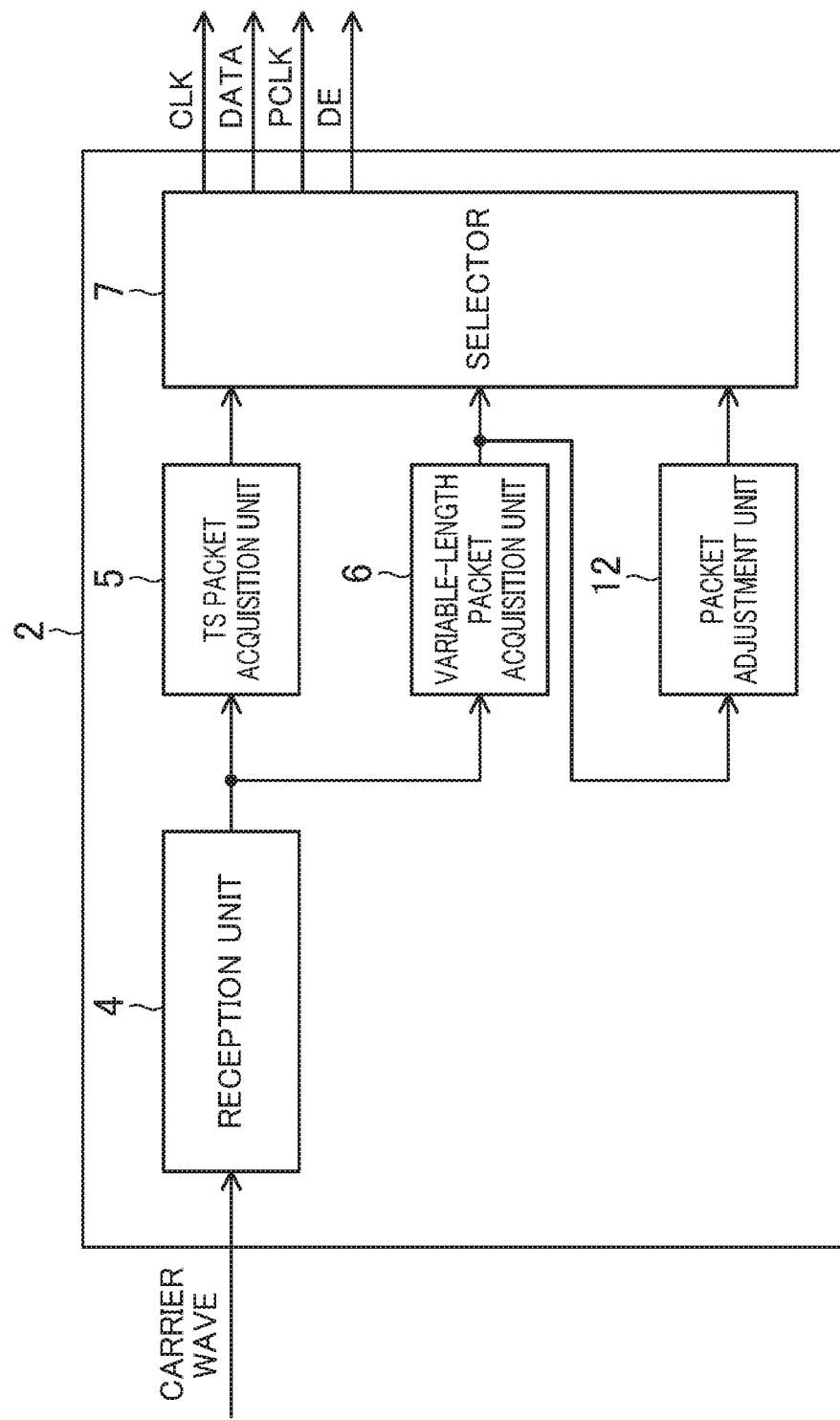
FIG. 9 is a block diagram illustrating a configuration for a receiver including an interface device according to a second embodiment.

FIG. 9 is a block diagram illustrating a configuration for a receiver including an interface device according to a second embodiment. The following description of the second embodiment will be focused on differences from the first embodiment described above.

An interface device 2 according to this embodiment includes a reception unit 4, a TS packet acquisition unit 5, a variable-length packet acquisition unit 6, a selector 7, and a packet adjustment unit 12.

The packet adjustment unit 12 may adjust the size of variable-length packets such as TLV packets supplied from the variable-length packet acquisition unit 6 to that of the TS packets. Thus, if the TS packets have a size of 188 bytes, for example, then the packet adjustment unit 12 adjusts the size of variable-length packets to 188 bytes. In other words, the packet adjustment unit 12 makes the variable-length packets processible as pseudo-fixed-length packets.

The selector 7 selectively passes the output of any one of the TS packet acquisition unit 5, the variable-length packet acquisition unit 6, or the packet adjustment unit 12.

Optionally, the packet adjustment unit 12 may form an integral part of the variable-length packet acquisition unit 6. In that case, the selector 7 may selectively pass either the output of the TS packet acquisition unit 5 or that of the integrated circuit.

The packet adjustment unit 12 according to this embodiment is able to form pseudo-fixed-length packets based on variable-length packets in various manners. Some of those variations will be described below with reference to the accompanying drawings.

—First Variation—

Figure 10:
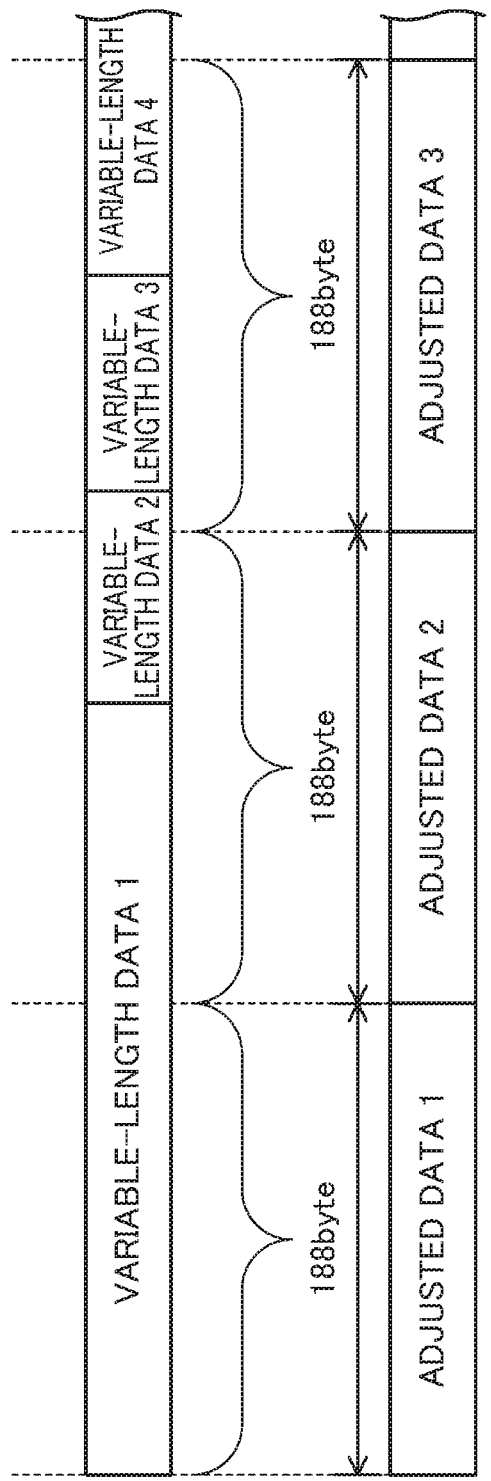
FIG. 10 illustrates a first exemplary situation where fixed-length packets are formed out of variable-length packets.

FIG. 10 illustrates a first exemplary technique for forming fixed-length packets out of variable-length packets.

As shown in FIG. 10, Variable-Length Data 1-4, which are variable-length packets of respectively different sizes, have their sizes adjusted to be Adjusted Data 1-3, which are fixed-length data each having a size of 188 bytes, for example.

Specifically, Variable-Length Data 1 has a length of greater than 188 bytes, and has a top portion thereof cut off at a point of 188 bytes, thereby forming Adjusted Data 1. Meanwhile, the remainder of Variable-Length Data 1 and a top portion cut out from Variable-Length Data 2 are combined together to form Adjusted Data 2.

Furthermore, the remainder of Variable-Length Data 2, all of Variable-Length Data 3, and a top portion cut out from Variable-Length Data 4 are pieced together to form Adjusted Data 3.

In this manner, the packet adjustment unit 12 forms multiple items of fixed-length adjusted data by adjusting the sizes of multiple items of variable-length data as described above.

—Second Variation—

FIG. 11 illustrates a second exemplary technique for forming fixed-length packets out of variable-length packets. In the example shown in FIG. 11, a TMCC signal to be transmitted while being multiplexed in an advanced BS digital broadcast signal, for example, is supposed to include a TLV-ID to be used as an identifier.

For example, assume Variable-Length Data 1 and 3 have been selected by the TLV-ID from among Variable-Length Data 1-4 which are variable-length packets. In that case, the non-selected Variable-Length Data 2 and 4 are nullified to turn into NULL data. The processing of nullifying the non-selected Variable-Length Data 2 and 4 may be performed by the variable-length packet acquisition unit 6, a block preceding the variable-length packet acquisition unit 6, or the packet adjustment unit 12.

Thereafter, Variable-Length Data 1 has a top portion thereof cut off at a point of 188 bytes, thereby forming Adjusted Data 1. Meanwhile, the rest (i.e., the remainder) of Variable-Length Data 1 and a top portion cut out from the NULL data are combined together to form Adjusted Data 2.

Furthermore, the rest (i.e., the remainder) of the NULL data, all of Variable-Length Data 3, and a top portion cut out from another NULL data are pieced together to form Adjusted Data 3.

This allows the packet adjustment unit 12 to send out only the data selected by the TLV-ID. Optionally, the non-selected variable-length data does not have to turn into mere NULL data but may also be a predetermined type of data. For example, the non-selected variable-length data may be replaced with an arbitrary type of data such as 0×FF.

Additionally, the NULL data may have a header portion included in common in any variable-length data, and may have such a format that indicates the size of the NULL data.

Thus, even if NULL data is included, extraction of the size of the NULL data also allows the packet adjustment unit 12 to extract the top portion of the next variable-length data that follows the NULL data.

The same remark also applies to even a situation where adjusted data is generated based on IP packets that are variable-length packets.

In the example described above, the non-selected variable-length data is supposed to be replaced with NULL data. However, the non-selected variable-length data may also be removed. That is to say, in the state just before the adjustment shown in FIG. 11, Variable-Length Data 1 may be followed by Variable-Length Data 3, instead of the NULL data.

FIG. 12 is a timing chart illustrating a situation where the fixed-length packets shown in FIGS. 10 and 11 are sent out.

As shown in FIG. 12, the variable-length packets may be sent out on a 188 byte basis, for example. Thus, variable-length packets may be sent out in the same format as TS packets that are fixed-length data.

This thus allows even the backend processor 3 configured to process fixed-length data to handle variable-length packets as fixed-length data.

In FIG. 12, the signals PCLK and DE may be omitted. Additionally, the signal PCLK may be activated at regular intervals, each of which may be as long as the size of TS packets (of, e.g., 188 bytes). Alternatively, the signal PCLK may also be activated at the beginning of each item of variable-length data yet to have its size adjusted.

—Third Variation—

FIG. 13 is a timing chart, illustrating a third exemplary technique for forming fixed-length packets out of variable-length packets and sending them out. In FIG. 13, the waveform of the signal CLK is not shown.

In the example illustrated in FIG. 13, the sizes of variable-length packets are adjusted to be an integral number of times as long as that of a fixed-length packet.

Specifically, Variable-Length Data 1, which is a variable-length packet, is divided into Fixed-Length Data 1 with a length of 188 bytes and data with a length of less than 188 bytes. In this case, dummy data Pd1 is added to the latter data with a length of less than 188 bytes.

That is to say, the data accounting for the first 188 bytes of Variable-Length Data 1 constitutes Adjusted Data 1, and the sum of the rest of Variable-Length Data 1 and the data Pd1 that has been added until their combined size reaches 188 bytes constitutes Adjusted Data 2.

Variable-Length Data 2 has a size of less than 188 bytes. Thus, dummy data Pd2 is added to Variable-Length Data 2 until their combined size reaches 188 bytes. In this manner, the sum of Variable-Length Data 2 and the data Pd2 constitutes Adjusted Data 3.

When each of Adjusted Data 1-3 is sent out, a signal PCLK to be activated at the beginning of Variable-Length Data 1-3 yet to have their sizes adjusted is used.

In this example, some padding data is added to the input variable-length data, and their sum is output. Thus, the overflow may be substantially prevented with the output transmission rate set to be higher than the input transmission rate.

Also, dummy data is supposed to be added to the end of variable-length data in the example described above, but may be added to the beginning of variable-length data instead. That is to say, dummy data may be added anywhere as long as the size of adjusted variable-length data becomes equal to that of a TS packet.

As can be seen from the first, second and third variations described above, the packet adjustment unit 12 adjusts the sizes of variable-length packets to form fixed-length data of the same size as a TS packet. Note that any variable-length packet received at the packet adjustment unit 12 may include a predetermined type of dummy data as well.

When each of Adjusted Data 1-3 that are fixed-length data is sent out from the interface device 2, the signal PCLK is activated at the beginning of Variable-Length Data 1-3. That is to say, the signal PCLK is a signal indicating the beginning of data, but may be activated at the beginning of adjusted data corresponding to the beginning of variable-length data.

This allows the backend processor 3 to receive a variable-length packet as fixed-length data, and to detect the actual location of the beginning of received data (i.e., the beginning of the variable-length packet) based on the signal PCLK.

As can be seen from the foregoing description, turning variable-length packets into pseudo-fixed-length packets allows the backend processor 3 to change the content of processing, the transmission protocol, or any other factors much less often.

Considering the efficiency of transmission of the signal DATA to be sent out from the interface device 2 according to the first and second embodiments, variable-length packets are beneficially sent out as they are.

However, just sending out variable-length packets requires the backend processor 3 to calculate the beginning, size, and other parameters of a packet by reference to the header information of the packet, and to locate the boundary between multiple variable-length packets. In this case, if the header information cannot be analyzed anymore for some reason such as garbling, then the backend processor 3 may no longer be able to perform normal processing.

Thus, to enable the backend processor 3 to perform stabilized processing while maintaining good transmission efficiency, the interface device 2 may send out the signal DATA as shown in FIG. 14.

FIG. 14 is a timing chart illustrating a situation where a plurality of variable-length packets are sent out as they are. In FIG. 14, the waveform of the signal CLK is not shown.

As shown in FIG. 14, the signal PCLK to be activated at the beginning of each of Variable-Length Data 1-3 that are variable-length packets is sent out synchronously with the Variable-Length Data 1, 2, or 3.

This allows the backend processor 3 to accurately locate the beginning of each of Variable-Length Data 1-3 in response to the signal PCLK. Thus, the backend processor 3 may have some software processing performed therein by a central processing unit (CPU) so as to detect variable-length data in response to the signal PCLK.

An interface device according to the present disclosure may transmit multiple different types of signals without using an increased number of terminals or lines, and therefore, is useful for reducing the circuit size and/or cost of a receiver including the interface device.

What is claimed is:

1. A method performed in a DTV receiver, the method comprising the steps of:
performing demodulation processing and error correction processing on an input carrier wave and outputting signals resulting from these types of processing;
acquiring a transport stream (TS) packet included in the signals;
acquiring a variable-length packet included in the signals; and
selecting either the TS packet or the variable-length packet and outputting the selected packet as a data signal in sync with a clock signal,
wherein the variable-length packet is either a type length value (TLV) packet or an Internet protocol (IP) packet, and
wherein the variable-length packet is not included in the TS packet.

2. A method performed in a DTV receiver, the method comprising the steps of:
performing demodulation processing and error correction processing on an input carrier wave and outputting signals resulting from these types of processing;
acquiring a transport stream (TS) packet included in the signals;
acquiring a variable-length packet included in the signals; and
selecting either the TS packet or the variable-length packet and outputting the selected packet as a data signal in sync with a clock signal in accordance with an external signal,
wherein the variable-length packet is not included in the TS packet.

3. A method performed in a DTV receiver, the method comprising the steps of:
performing demodulation processing and error correction processing on an input carrier wave and outputting signals resulting from these types of processing;
acquiring a transport stream (TS) packet included in the signals;
acquiring a variable-length packet included in the signals; and
selecting either the TS packet or the variable-length packet and outputting the selected packet as a data signal in sync with a clock signal,
wherein the variable-length packet is not included in a TS packet.

4. A method of transmitting a data signal in sync with a clock signal, the method comprising:
performing demodulation processing and error correction processing on an input carrier wave and outputting signals resulting from these types of processing, the signals including a transport stream (TS) packet and a variable-length packet as a different packet from the TS packet; and
selecting a type of processing among a plurality of types of processing in accordance with a command issued by a backend processor which receives a signal based on the data signal,
wherein the plurality of types of processing at least comprise:
acquiring the transport stream (TS) packet included in the signals to output the TS packet as the data signal, and
acquiring the variable-length packet included in the signals to output the variable-length packet as the data signal,
wherein the variable-length packet is not included in the TS packet.

5. The method of claim 4, wherein
if the acquiring the variable-length packet included in the signals to output the variable-length packet as the data signal is selected, adjustment of the at least one variable-length packet is performed such that the at least one variable-length packet turns into a single packet having the same size as the TS packet or a plurality of packets each having the same size as the TS packet.

6. The method of claim 5, wherein
a first variable-length packet and a second variable-length packet that are continuous are received as the variable-length packet, and
the adjustment includes:
- dividing the first variable-length packet from its beginning into a plurality of portions by the size of the TS packet and sequentially outputting the plurality of portions of the first variable-length packet one after another; and
- if the first variable-length packet includes an indivisible portion short of the size of the TS packet, processing the second variable-length packet continuously with the indivisible portion of the first variable-length packet, thereby outputting a packet having the same size as the TS packet and comprised of the indivisible portion of the first variable-length packet and a top portion of the second variable-length packet.

7. The method of claim 5, wherein
a variable-length packet and a second variable-length packet that are continuous are received as the variable-length packet, and
the adjustment includes:
- dividing the first variable-length packet from its beginning into a plurality of portions by the size of the TS packet and sequentially outputting the plurality of portions of the first variable-length packet one after another; and
- if the first variable-length packet includes an indivisible portion short of the size of the TS packet, continuously processing the indivisible portion of the first variable-length packet and predetermined data having the same size as the second variable-length packet, thereby outputting a packet having the same size as the TS packet and comprised of the indivisible portion of the first variable-length packet and a top portion of the predetermined data.

8. The method of claim 6, wherein the second variable-length packet is comprised of predetermined data having the same size as the packet received as the input carrier wave.

9. The method of claim 5, wherein
a first variable-length packet and a second variable-length packet that are continuous are received as the variable-length packet, and
the adjustment includes:
- dividing the first variable-length packet from its beginning into a plurality of portions by the size of the TS packet and sequentially outputting the plurality of portions of the first variable-length packet one after another; and
- if the first variable-length packet includes an indivisible portion short of the size of the TS packet, adding predetermined data to the indivisible portion of the first variable-length packet, thereby outputting a packet having the same size as the TS packet and comprised of the indivisible portion of the first variable-length packet and the added data.

10. The method of claim 5, wherein
a packet clock signal indicating a beginning of the data signal is output along with the data signal, and
the packet clock signal is activated at a beginning of the packet after the adjustment, the beginning of the output packet corresponding to a beginning of the at least one variable-length packet.

* * * * *